United States Patent [19]

Grimm et al.

[11] Patent Number: 4,601,091

[45] Date of Patent: Jul. 22, 1986

[54] METHOD OF AND APPARATUS FOR THE HEIGHT ADJUSTMENT AND INSTALLATION OF A SLIDING AND/OR RAISABLE ROOF MEMBER TO BE FITTED INTO AN AUTOMOBILE

[75] Inventors: Rainer Grimm, Wetzlar; Horst Böhm, Frankfurt, both of Fed. Rep. of Germany

[73] Assignee: Rockwell-Golde G.m.b.H, Fed. Rep. of Germany

[21] Appl. No.: 752,708

[22] Filed: Jul. 8, 1985

[30] Foreign Application Priority Data

Sep. 28, 1984 [DE] Fed. Rep. of Germany ....... 3435813

[51] Int. Cl.⁴ ................ B23P 17/00; B23Q 3/00; B60J 7/05; B60J 7/053
[52] U.S. Cl. ...................... 29/423; 29/464; 296/221; 296/222
[58] Field of Search .............. 296/221, 222, 223; 29/423, 464

[56] References Cited

U.S. PATENT DOCUMENTS

| 4,257,646 | 3/1981 | Schatzler | 296/222 |
| 4,350,385 | 9/1982 | Schataler | 296/222 |
| 4,417,763 | 11/1983 | Schlapp et al. | 296/221 |
| 4,537,442 | 8/1985 | Jardin | 296/221 |

FOREIGN PATENT DOCUMENTS

| 2121872 | 1/1984 | United Kingdom | 296/222 |
| 2133460 | 7/1984 | United Kingdom | 296/222 |

*Primary Examiner*—Howard N. Goldberg
*Assistant Examiner*—Steven Nichols

[57] ABSTRACT

In a method and apparatus for the height adjustment and installation of a slidable and/or raising, rigid roof member, to be built into a roof opening of an automobile roof, which roof member, after its height adjustment, is screwed to elements of the roof construction which do not participate in the height adjustment movement, a rapid and reliable height adjustment and installation are achieved in that, first the actuating elements are moved into the closed position, whereupon the roof member is inserted, by means of an installation template engaging over the roof opening and to be positioned onto the automobile roof, into the roof opening in a defined position with pressing of the roof member front edge onto the associated roof opening edge and simultaneous height adjustment, whereafter finally the screwing of the roof member in this position takes place.

14 Claims, 7 Drawing Figures

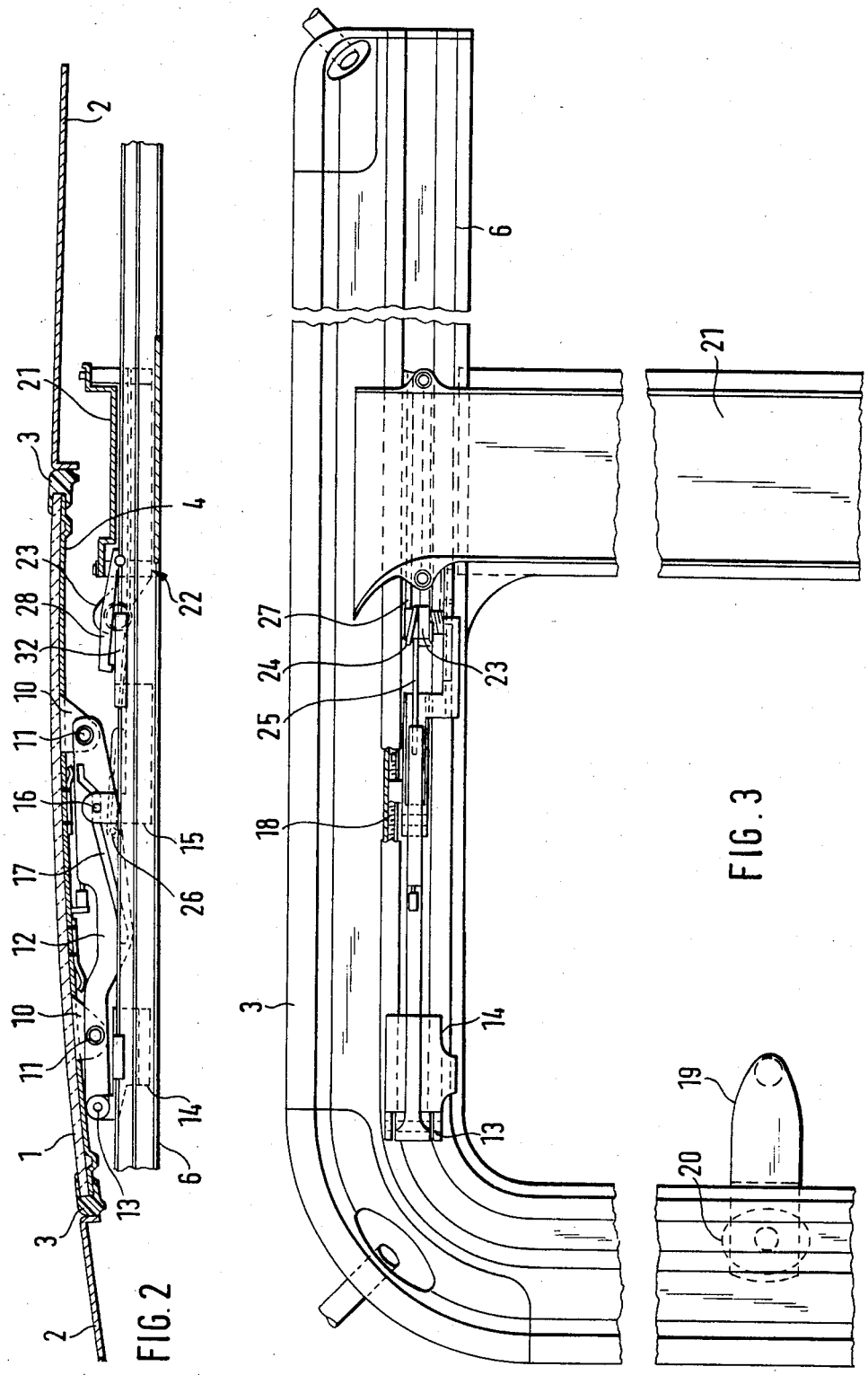

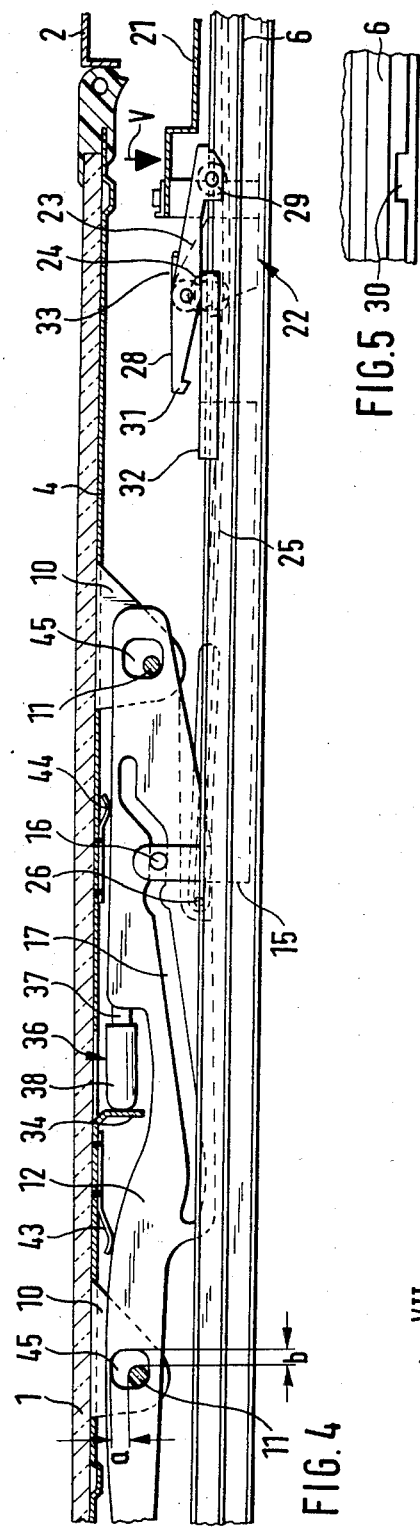

METHOD OF AND APPARATUS FOR THE HEIGHT ADJUSTMENT AND INSTALLATION OF A SLIDING AND/OR RAISABLE ROOF MEMBER TO BE FITTED INTO AN AUTOMOBILE

BACKGROUND OF THE INVENTION

(1) Technical Field

This invention relates to a method of and apparatus for the height adjustment and installation of a slidable and/or raisable roof member to be fitted into an automobile.

(2) Description of the Prior Art

For visual and streamline flow reasons, it is important that a sliding and/or raisable automobile roof member equipped with a surrounding seal shall be so fitted in a roof opening of the automobile that any convex curvature in the longitudinal and transverse directions shall accurately coincide with the curvature of the fixed main body of the automobile roof surrounding the opening. Since the roof member itself is installed separately from the other parts of the roof construction, such as a roof frame, guide bars, raising elements and actuating components, which in more recent roof constructions are combined into one installation unit (as shown for example in DE-OS No. 32 21 487), special measures are required which shall enable the roof member on the preassembled actuating unit to be adjusted into alignment with the fixed main body of the automobile roof. In this connection it is of particular importance, apart from the correspondence of curvature, that the roof member shall bear tightly against the forward edge of the roof opening in order to eliminate all manufacturing tolerances which, in the case of a roof member inserted into the roof opening without forward bearing contact and screwed to guiding and raising elements, could lead, during actuation of the roof member, to the roof member not bearing in the closed position of its actuating elements tightly against the forward edge of the roof opening, and jamming against the rear edge of the roof opening during pivotal movements of the roof member.

To overcome these roof member adjustment problems, ever since sliding roofs with a rigid roof member have been used, numerous possible ways for the aligned adjustment of the roof members of automobiles have been proposed.

In one widely used construction (as disclosed in DE-PS No. 16 55 543), on a roof member reinforcement which forms one unit with the roof member, a threaded plate is permanently fixed in the adjustment range in a recess of the roof member reinforcement. This threaded plate possesses a threaded bore of larger diameter at the centre and two threaded bores of smaller diameter at equal distances from the threaded bore. A countersunk screw having a flat head engages into the central bore the head of the screw in turn bearing against a guide plate which serves as a guide for the sliding roof member. This plate possesses, beneath the slot of the countersunk screw, an opening for the passage of a tool for turning that screw. The guide plate is detachably connected with two screws to the threaded plate at the roof member insert. For the alignment adjustment of the roof member the countersunk screw is turned from the interior of the vehicle until the roof member surface is flush with the main roof surface. Thereafter the roof member is pressed with its forward edge against the forward edge of the roof opening and then, if necessary, is again adjusted in the stated manner. While retaining the bearing pressure, the two fixing screws are now tightened up. In doing this the guide plate is pressed against the flat head of the countersunk screw, thus producing a firm connection between guide plate and roof member. This adjustment operation is carried out and if necessary repeated in all intended adjustment regions on the roof member. It is obvious that this known height adjustment is very time-consuming.

For the height adjustment of the rear region of a sliding roof member it is known (from DE-PS No. 25 32 187, for example) to provide laterally on the roof member reinforcement downwardly cranked angles, which bear against the inner faces of guide blocks. The guide blocks are connected, via pins of a rear guide sliding in the slots of the guide block, with the guide rails on the roof frame. In the region of the downwardly cranked angles, the guide block is furnished with an elongate hole in a perpendicular direction. An adjusting screw engages through this elongate hole into a threaded bore of the angle. By this connection of the roof member with the guide block, the aligned adjustment is carried out on each side of the roof member, which again is a time-consuming operation.

A feature common to all these known proposals for adjusting the roof member to the main roof surface surrounding it is that the operations are cumbersome and very time-consuming, because at the time of the installation of the roof member four adjustment operations have to be carried out, requiring a repeated alternation of adjustment operation inside the vehicle and check of the flush alignment of the roof member and main roof member surface from outside.

OBJECTS OF THE INVENTION

It is an object of the present invention to provide a method for the height adjustment and installation of the sliding roof member which can be carried rapidly and reliably, without the fitter having to carry out an external observation of the position of alignment during the installation. It is also an object to provide apparatus suitable particularly for carrying out this method.

SUMMARY OF THE INVENTION

According to one aspect of the present invention, there is provided a method for the installation and height adjustment of a slidable and/or raisable, rigid roof member in a roof opening of an automobile roof, the method including the steps of first moving actuating elements of the roof construction into a roof-member-closed position, inserting the roof member into the roof opening in a defined position by means of a template engaging over the roof opening and positioned on the automobile roof while pressing a front edge of the roof member onto an adjacent roof opening edge and simultaneously adjusting the height of the roof member relatively to the roof, and thereafter securing the roof member in this installed position at a plurality of locations.

Preferably, with the method as just defined, said roof member is inserted into the roof opening against spring forces in such a way that said roof member is pressed with its forward edge against said roof opening edge but remains displaced in a position situated above the automobile roof until it is urged against the spring forces as far as the height-adjusted position provided by said template.

Alternatively, the defined method can further comprise bonding said roof member in a defined position to said template, inserting said roof member into the roof opening, placing said template onto the automobile roof, said roof member thereby attaining its height-adjusted position relatively to the automobile roof, and breaking the bond between said roof member and template after the roof member has been secured.

According to another aspect of the present invention, there is provided an apparatus for carrying out the method essentially as defined in one of the two preceding paragraphs.

DESCRIPTION OF THE DRAWINGS

For a better understanding of the invention and to show how the same may be carried into effect, reference will now be made, by way of example, to the accompanying drawings in which:

FIG. 2 is a longitudinal section taken along the line II—II in FIG. 1;

FIG. 3 is a plan view of part of a sliding roof frame with functional components fitted, but without the roof member;

FIG. 4 is a longitudinal section through part of the roof construction, to a larger scale than that shown in FIG. 2;

FIG. 5 is a partial plan of a guide rail viewed in the direction of arrow V in FIG. 4;

FIG. 6 is a view similar to FIG. 4, but showing a telescopic spring arrangement partly sectioned and showing the screwing of a raising element to fixing lugs of the roof member; and FIG. 7 is a partial section along VII—VII in FIG. 6 through such a screwed connection.

DESCRIPTION OF THE PREFERRED EMBODIMENT

Figure 1:
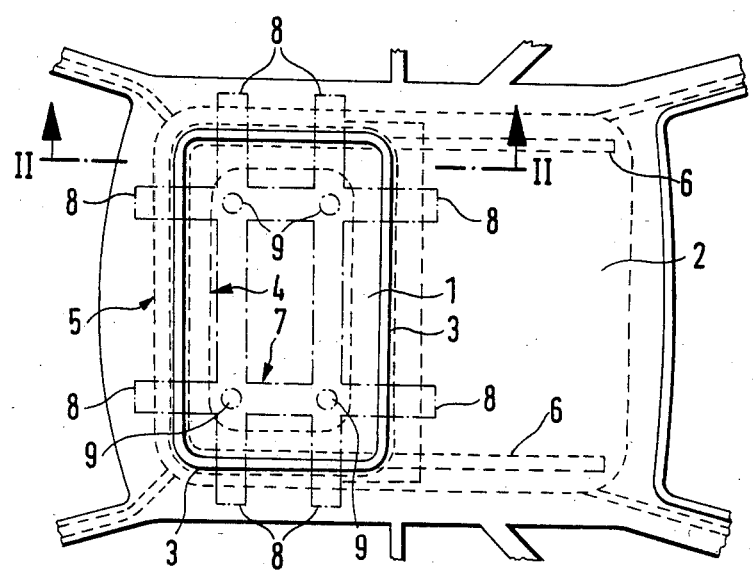
FIG. 1 is a plan view of an automobile roof with a roof member inserted and an installation template, shown in dot-and-dash lines.

FIG. 1 shows a rigid sliding roof member 1 in its closed position in a roof opening of a main, fixed automobile roof 2, and is surrounded by an edge gap seal 3, which assures sealing relative to the fixed roof 2 when the roof member 1 is closed. A reinforcing frame 4 of the roof member 1 and a roof frame 5 are shown in broken lines. The roof member 1 is slidably guided in a manner to be described on lateral guide rails 6, fixed to the roof frame 5.

A template 7, shown in dot-and-dash lines, to assist in installation, is placed from above on the fixed roof 2 and roof member 1 and engages over the roof opening by means of a plurality of uniformly distributed arms 8. The template 7 is constructed, on its side facing towards the roof member 1 and roof 2, according to the method of installation which is to be used. For one method, the template 7 possesses in total a bottom surface which completely corresponds to the position and form of the roof curvature. Additional precautions may be taken in order to ensure accurate seating of the template 7 on the roof member 1 and roof 2. This also applies for the other method of installation to be described.

With the latter method, a plurality of bonding elements 9, in the present example four, are distributed over the area of the lower face of the template 7, which elements may be constructed either as vacuum suction elements or as electromagnets.

All the area regions of the lower face of the template 7 may lie in the plane of the roof curvature. Stepped forms of construction of the lower face of the template 7 are, however, also conceivable, bearing surfaces for the sliding roof member 1 and bearing surfaces for the fixed automobile roof 2 being provided in a spaced distribution. The template 7 can rest upon the fixed automobile roof 2 exclusively by its own weight or may additionally be pressed from above onto the fixed automobile roof 2 by appropriate arrangements. If a template 7 is to be used for several types of vehicle with different roof curvatures, the template 7 may be so constructed that its bearing surfaces are adjustable in height to adapt to the different roof curvatures. The template 7 may be provided, of course, with a suitable handling device (not shown) or with an eye (also not shown) for attachment of a lifting device.

As can be seen, for example from FIG. 2 in conjunction with FIG. 7, the reinforcing frame 4 of the sliding roof member 1, in this case constructed as a glass sliding roof member, possesses, at each side, two downwardly extending fixing lugs 10, which advantageously may be bent from the frame 4 itself, which are screwed in a manner to be described by screws 11 to a raising element 12 situated on each side of the sliding roof member 1 in order to hold it. The raising element 12 extends over a considerable range of the length of the roof member and is connected at its front via a pivot 13 with one of two forward sliding shoes 14, which are slidably guided longitudinally in respective guide rails 6. Guidance at the rear on each side is provided by a rear sliding shoe 15, likewise slidably guided longitudinally in the respective guide rails 6. Each shoe 15 engages slidably with a guide pin 16 which runs in a guide slot or track 17 in the side of the raising element 12. The dimensions and form of the guide track 17 facilitate, in known manner, when adjustment movements of the rear sliding shoe 15 relative to the forward sliding shoe 14 take place, pivotal movement of the roof member 1 about its pivot 13 upwards and to a certain extent also downwards, each starting from the roof member closed position shown in FIG. 2. To displace the rear sliding shoe 15, an actuating cable 18 furnished with an external thread (FIG. 3) engages in known manner onto this sliding shoe 15. Displacement of the actuating cable 18 can be effected with a hand crank 19 via a gear 20, connected therewith and engaging on the thread of the actuating cable 18. In other respects the roof drive, itself known, is not explained in greater detail.

A water gutter 21, associated with the rear edge gap between roof member 1 and fixed automobile roof 2, is slidably mounted at both sides by guide shoes 22 on the guide rails 6. According to the sliding, lifting roof described in DE-OS No. 33 00 308, on each side of the roof, the raising element 12, rear sliding shoe 15, guide shoe 22 and guide rail 6 are all connected together in a manner permitting raising by functional elements to be described.

A lever spring 24 is pivotally mounted by its helical winding on a bearing projection 23 of one of the guide shoes 22. The lever spring 24 is articulated by a forwardly extending arm 25 thereof on a bearing pin 26 situated on the raising element 12. The arm 25 constitutes a connecting element between the raising element 12 or roof member 1 on the one hand and the guide shoe 22 of the water gutter 21 on the other hand, this connecting element being pivotal in a vertical plane lying in the sliding direction. Another arm 27 of the lever spring 24 bears against the guide shoe 22. The lever spring 24 is prestressed in such a way that the roof member 1, when in a pivoted-out position, is spring biassed in the closure direction, i.e. in the direction of pivoting about its forward pivot 13.

On the bearing projection 23, a two-armed lever 28 is also pivotally mounted, which carries on a rearwardly oriented arm thereof a detent element 29, which co-operates with a recess 30 (FIG. 5) situated in the guide rail 6 in the region of the rear roof opening edge. A forwardly pointing arm of the two-armed lever 28 carries a downwardly oriented hook 31, which co-operates with a control projection 32 fixed to the rear sliding shoe 15. The control projection 32 acts, in a specific movement sequence, also upon the detent element 29. A spring 33, mounted at the bearing position of the two-armed lever 28, biasses the two-armed lever 28 in the direction to cause engagement between the detent element 29 in the recess 30.

As can be seen especially from FIG. 4, the detent element 29 is situated, when the roof member is closed, in the recess 30 of the guide rail 6, causing the guide shoe 22 to be non-displaceably fixed relatively to the guide rail 6. Since the hook 31 of the two-armed lever 28, in this position of the components, does not, however, engage with the control projection 32 of the rear sliding shoe 15, the rear sliding shoe 15 can move away from the guide shoe 22 when the cable drive is appropriately actuated, causing the guide pin 16 to slide in the guide track 17 of the raising element 12 in such a way that the roof member 1 is pivoted upwards. It can be seen that, in the pivoting-in operation also, the guide shoe 22 remains in a stationary position on account of the engagement between the detent element 29 and the recess 30. The roof member 1 now bears in a positively controlled manner via the arm 25 against the guide shoe 22, so that the roof member 1 when returning from its raised position is completely prevented from resting upon the rear part of the fixed automobile roof 2.

With an opening displacement of the roof member 1 starting from the position of the components shown in FIG. 4, the rear sliding shoe 15 moves towards the still stationarily fixed guide shoe 22, the rear edge of the roof member 1 being pivoted downwards as a consequence of the form of the guide track 17 in the raising element 12. As the actuating movement is continued in the stated direction, the control projection 32, by running onto the two-armed lever 28, ensures that the detent element 29 is moved out of the recess 30 against the force of the spring 33. With the pivotal movement of the two-armed lever 28, the hook 31 comes into engagement with the control projection 32, causing a rigid coupling to be produced between the rear sliding shoe 15 and the guide shoe 22.

As actuation of the cable drive continues in the described direction, the roof member 1 is entrained in the direction of its opening displacement by the rear sliding shoe 15, by bearing of the guide pin 16 against the rear end of the guide track 17. Simultaneously, the guide shoe 22 is displaced rearwardly via the arm 25 of the lever spring 24. Since the detent element 29 now runs, by means of a roller mounted on it and not referenced, on the upper flange surface of the guide rail 6, the hook 31 is kept in engagement with the control projection 32. This coupling engagement ensures, in a sliding displacement of the roof member 1, that the forwardly travelling, rear sliding shoe pulls with it the guide shoe 22 and thus also the water gutter 21 in the closure sliding direction. The sliding roof member 1 is hereby also displaced forwards via the arm 25 of the lever spring 24. The sliding displacement in the closure direction of the roof member 1 continues until the detent element 29 again engages into the recess 30, with simultaneous decoupling of the hook 31 from the control projection 32. By this engagement the guide shoe 22 is firmly held so long as the drive movement continues in the same direction, so that the rear sliding shoe 15 again moves away from the guide shoe 22. The roof member 1 now rises with its rear edge on account of the guidance of the guide pin 16 in the guide track 17, until it reaches its closed position shown in FIGS. 2 and 4.

The above-described constructional features of the sliding, lifting roof illustrated in the drawings, do not form part of the present invention, but they have been explained to assist in understanding of the method of functioning of the roof illustrated in the drawings. Reference will now be made below to those constructional elements which are intended for facilitating the height adjustment and installation of the roof member 1.

The following description of the apparatus relates to those elements which, in the first form of embodiment of the present method, ensure automatic setting of the roof member 1 when the template 7 is seated on the roof member 1 and the fixed automobile roof 2. For this purpose, at each of the two sides of the reinforcing frame 4, of which only the one side has been generally referred to in the preceding description and shown in the drawings because the other side is opposite handed, a stop 34 is provided (FIGS. 4, 6) in the form of a portion downwardly cranked out of the reinforcing frame 4. The stop 34 penetrates an upwardly open recess 35 of the raising element 12. A spring element in the form of a telescopic spring 36 and fixed to the raising element 12, is mounted opposite to the stop 34. In the example shown a piston element 37 of the telescopic spring 36 is fixed by injection moulding to the raising element 12 around it as shown in FIG. 6. The piston element 37 is concentrically surrounded by a telescopic sleeve 38, slidably guided thereon, which is caused to bear against the piston element 37 by a helical compression spring 39. Bearing surfaces 40 and 41 on the telescopic sleeve 38 and piston element 37 respectively ensure that the helical compression spring 39 can push the telescopic sleeve 38 outwardly of the piston element 37 only up to a limiting extent. This limit of extent of the components is shown in FIG. 6.

As its forward end towards the stop, the telescopic sleeve 38 possesses, in the example shown, a run-on surface 42 formed substantially as a part-spherical dome, which could, however, also be constructed as a conical surface. This run-on surface 42 facilitates insertion of the roof member 1 into the roof opening when the telescopic springs 36 are fully extended forwards. The stops 34 then encounter the run-on surfaces 42, causing the telescopic sleeves 38 to be displaced backwards against the force of the helical compression springs 39, i.e. to the right as illustrated in FIG. 6. When the roof member 1 is inserted, the telescopic springs 36 push the roof member 1 forwards, i.e., to the left as viewed in the drawings, causing the roof member to bear with its front edge, through the intermediary of the edge gap seal 3, sealingly against the forward edge of the roof opening.

Instead of the described telescopic springs, other spring arrangements ensuring that the roof member 1 is prestressed in the closure direction relative to the raising elements 12, would also be suitable.

In addition there are also provided on the roof member 1, i.e. on the reinforcing frame 4 of the roof member 1, two leaf springs 43 and 44 on each side spaced apart and acting as vertical springs, each of which is fixed at one end to the reinforcing frame 4, for example by spot welding. The free ends of the leaf springs are, by contrast, so arranged that when the roof member 1 is placed in the roof opening they come to bear against surfaces of the raising element 12 facing them, before the roof member has reached its height adjusted position in alignment with the fixed automobile roof so that the roof member still projects above the upper fixed roof surface. When the template 7 is placed in position, the roof member 1 is forced downwards against the force of the leaf springs 43, 44 as far as the alignment position between upper surface of roof member 1 and upper surface of fixed automobile roof 2, the template bearing against the fixed roof surfaces.

Before the roof member 1 is placed in the roof opening, the described functional parts of the roof member drive are brought into the position shown in FIGS. 2 to 4, which may be done easily by appropriate actuation of the hand crank 19. The detent element 29 is here engaged with the recess 30, and the guide pin 16 is situated in the position shown in FIG. 4 inside the guide track 17. The described position of the functional components corresponds to the closed position of the roof member. If the roof member 1 is now inserted and then the template 7 is placed on it, the telescopic springs 36 ensure a firm pressure of the front edge of the roof member against the associated forward edge of the roof opening, while the leaf springs 43 and 44 cause the roof member 1 to press against the underside of the template 7 and thus the desired aligned position between the roof member 1 and the fixed automobile roof 2 is achieved. After this only a rigid connection between the raising elements 12 and the fixing lugs 10 needs to be carried out.

Like the aforementioned telescopic springs 36 the leaf springs 43 and 44 have no further function after the completion of installation, height adjustment and screwing. They represent, however, simple erection aids, which do not require any particular expenditure of material or time for their fitting.

To enable a tolerance compensation to be carried out both vertically and horizontally, through openings 45 are provided in the raising elements 12 for fixing the roof member 1 to the raising elements 12, the openings 45 each having substantially the form of a rectangle, as seen particularly clearly in FIG. 4. The lateral dimensions of the rectangle are so chosen that they are at least equal to twice the diameter of the screws 11. Therefore, if the cross-section of the openings 45 is made approximately square in each case, there are possible tolerance-compensating movements for the roof member 1 relative to the raising elements 12 and thus relative to the roof opening having the value a=b=diameter of screw 11 (FIG. 4).

The screws 11 each engage into a threaded bore 10 situated in the fixing lug or into a separate nut 46, as illustrated in FIG. 7. As can be seen from FIGS. 6 and 7, the through openings 45 are covered by clamping plates 47 when the screws 11 are fitted, guide pins 48 fixed to the raising element 12 and engaging into elongate holes 49 of the clamping plates 47 ensuring rotational locking of the clamping plates 47 while the screws 11 are tightened up. The screws 11 each pass through a respective further elongate hole 50, formed in the clamping plate 47 perpendicularly to the elongate holes 49. The elongate holes 49 and 50 ensure that the clamping plates 47 do not restrict the movements a and b of the screws 11 in the openings 45. Between the head of the screw 11 and the clamping plate 47 there is also a washer 51. Instead of a clamping plate 47 with its described devices for preventing rotation, a washer of considerably larger external diameter could be used, provided only that this washer sufficiently covers the opening 45 in every adjusted position to achieve a sufficient holding force when the screw 11 is tightened up.

Thus, in this first embodiment of the present method, the roof member 1 is inserted into the roof opening and therewith automatically loaded by spring forces in such a way that on the one hand it is pressed with its forward edge against the associated edge of the roof opening and on the other hand it remains displaced into a position situated above the fixed automobile roof 2 until it is forced vertically downwards against the spring forces as far as the height-adjusted position as the installation template 7 is placed on. In this embodiment the roof member adjustment is achieved both in respect of its forward bearing contact and in respect of its height position as the template 7 is pressed on and is then secured by screwing of the roof member.

If the height adjustment and installation of the roof member 1 are to be carried out according to the second form of embodiment of the method, then the stops 34, the telescopic springs 36 and the leaf springs 43, 44 are dispensed with. In this case the roof member 1, before insertion into the roof opening, is temporarily fixed in a position from below by means of the bonding elements 9 fitted to the template 7. The bonding elements 9, constructed as vacuum suction elements or electromagnets, hold the roof member 1 firmly during the insertion operation. During or after the insertion, the roof member 1 can be displaced forwards in order to achieve a firm bearing between its forward edge and the forward edge of the roof opening. The correct height adjusted position is then automatically achieved, because the arms 8 of the template 7 bear upon the fixed automobile roof 2. After the insertion and adjustment of the roof member, the fixed connection between the fixing lugs 10 and the raising elements 12 is carried out in the already described manner by means of the screws 11, passing through the large-area openings 45 in the raising elements 12.

In the roof member 1, contrary to the example illustrated and described, is of steel sheet, the bonding elements 9 may be either vacuum suction elements or electromagnets, the latter being preferred. If the roof member, by contrast, is of safety glass or plastics, the use of vacuum suction elements is recommended, although electromagnets can also be considered provided that the glass or plastics roof member is equipped on the underside with magnetisable temporary plates or the like, which would be removed after installation of the roof member.

Thus, in this a second embodiment of the present method the roof member is caused to bond to the installation template 7 in a defined position, whereupon it is inserted into the roof opening and, as the template is placed on the automobile roof 2, achieves its height-adjusted position, whereafter finally the bond between roof member and template is broken after the screwing operation has been carried out. With this method, no spring forces for the desired position adjustment of the roof member are necessary, because the position of the roof member is established by the template, detachably connected with the roof member. The template is placed on the automobile roof in such a manner that the roof member detachably fixed to it bears with its forward edge against the associated edge of the roof opening.

Having thus described our invention, what we claim is:

1. A method for the installation and height adjustment of a slidable and/or raisable, rigid roof member in a roof opening of an automobile roof, the method including the steps of first moving actuating elements of the roof construction into a roof-member-closed position, inserting the roof member into the roof opening in a defined position by means of a template engaging over the roof opening and positioned on the automobile roof while pressing a front edge of the roof member onto an adjacent roof opening edge and simultaneously adjusting the height of the roof member relatively to the roof, and thereafter securing the roof member in this installed position at a plurality of locations.

2. A method according to claim 1, wherein said roof member is inserted into the roof opening against spring forces in such a way that said roof member is pressed with its forward edge against said roof opening edge but remains displaced in a position situated above the automobile roof until it is urged against the spring forces as far as the height-adjusted position provided by said template.

3. A method according to claim 1 wherein said template is removed after said roof member has been secured in its installed position.

4. A method according to claim 1, and comprising the further steps of bonding said roof member in a defined position to said template, inserting said roof member into the roof opening, placing said template onto the automobile roof, said roof member thereby attaining its height-adjusted position relatively to the automobile roof, and breaking the bond between said roof member and template after the roof member has been secured.

5. An apparatus for carrying out a method for the installation and height adjustment of a slidable and/or raisable, rigid roof member in a roof opening of an automobile roof, the apparatus comprising a reinforcing frame fitted to the underside of said roof member, a roof frame surrounding the roof openings, raising elements slidably guided on the roof frame, parts of said reinforcing frame having securing lugs to enable said roof member to be secured to said raising elements, a stop on said reinforcing frame, a compression spring element secured to an adjacent roof member raising element, said spring element in its relaxed state being displaced with its end nearest the stop into a roof member closure displacement direction and, when the roof member is inserted, being displaceable against its spring bias by the stop with consequent spring loading of the roof member in the opposite direction, and there being further spaced-apart springs secured to the reinforcing frame, which springs, as said roof member is inserted, meet one of said roof member raising elements before said roof member has been urged into its correct height-adjusted position.

6. An apparatus according to claim 5, wherein said compression spring element is a telescopic spring which is furnished at its end nearest said stop with a run-on surface or the like for said stop.

7. An apparatus according to claim 6, wherein said further springs are leaf springs which are fixed at one end to said reinforcing frame and which project away from the reinforcing frame for bearing against said raising element.

8. An apparatus according to claim 5 and comprising openings in said raising elements to facilitate securing by screwing of said roof member to said raising elements.

9. An apparatus according to claim 8, wherein said openings each have substantially the form of a rectangle, the side dimensions of which being at least equal to twice the diameter of the screws to be used, and a threaded bore for the associated screw being provided in each of said fixing lugs.

10. An apparatus for carrying out a method for the installation and height adjustment of a slidable and/or raisable rigid roof member in a roof opening of an automobile roof, the apparatus comprising a template, a reinforcing frame fitted to the underside of said roof member, a roof frame surrounding said opening, raising elements slidably guided on the roof frame parts of said reinforcing frame having securing lugs to enable said roof member to be secured to said raising elements, said template having bearing surfaces and spaced bonding elements for temporarily bonding said template with said roof member.

11. An apparatus according to claim 10, wherein said bonding elements are constructed as vacuum elements.

12. An apparatus according to claim 10, wherein said bonding elements are constructed as electromagnets.

13. An apparatus according to claim 10 and comprising openings in said raising elements to facilitate securing by screwing of said roof member to said raising elements.

14. An apparatus according to claim 13, wherein said openings each have substantially the form of a rectangle, the side dimensions of which being at least equal to twice the diameter of the screws to be used, and a threaded bore for the associated screw being provided in each of said fixing lugs.

* * * * *